(12) United States Patent
Braun et al.

(10) Patent No.: US 6,367,813 B1
(45) Date of Patent: Apr. 9, 2002

(54) SEALING DISK

(75) Inventors: Wolfgang Braun, Ditzingen; Matthias Eisenmenger, Ludwigsburg; Jurgen Frasch, Holzgerlingen, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/508,719

(22) PCT Filed: May 6, 1999

(86) PCT No.: PCT/DE99/01361

§ 371 Date: May 15, 2000

§ 102(e) Date: May 15, 2000

(87) PCT Pub. No.: WO00/04308

PCT Pub. Date: Jan. 27, 2000

(30) Foreign Application Priority Data

Jul. 17, 1998 (DE) .......................................... 198 32 150

(51) Int. Cl.[7] ................................................ F16J 15/02
(52) U.S. Cl. ...................... 277/630; 277/637; 277/641; 411/533
(58) Field of Search ................................ 277/630, 637, 277/638, 641, 609, 616, 312; 411/533, 969, 970, 999; 403/274, 278–282

(56) References Cited

U.S. PATENT DOCUMENTS

| 1,854,730 | A | * | 4/1932 | Bell |
| 3,038,456 | A | * | 6/1962 | Dreisin |
| 3,060,562 | A | * | 10/1962 | Fransson |
| 4,494,898 | A | * | 1/1985 | Brownbill ..................... 413/14 |
| 4,688,960 | A | * | 8/1987 | Bien ............................ 403/285 |
| 5,022,664 | A | * | 6/1991 | Kitada et al. |
| 5,219,255 | A | * | 6/1993 | Hussain et al. ............. 411/432 |
| 5,335,411 | A | * | 8/1994 | Muller et al. ................. 29/512 |
| 5,393,183 | A | * | 2/1995 | Hinton ......................... 411/432 |
| 5,524,330 | A | * | 6/1996 | Alberini ....................... 29/437 |
| 5,544,902 | A | * | 8/1996 | Belter |
| 5,803,465 | A | * | 9/1998 | Schweiger ................... 277/593 |

* cited by examiner

Primary Examiner—Chuck Y. Mah
Assistant Examiner—Alison K. Pickard
(74) Attorney, Agent, or Firm—Ronald E. Greigg

(57) ABSTRACT

A sealing disk which is provided with a contour with which a contour or a face of a component on which the disk is to be disposed, is associated in complementary fashion. For premounting of the disk fixed on the component, the disk has a securing part, which is deformed for assembly and is deformed into an undercut or recess.

17 Claims, 2 Drawing Sheets

SEALING DISK

PRIOR ART

The invention is based on a sealing disk. Disks, in particular sealing disks, that are embodied as an annular disk are often premounted on some component such as a shaft or a housing and then together with this component are put together with the associated other component of a multipart arrangement. Until these two components have been put together, a disk mounted beforehand can become lost. There is a need to prevent this. This is particularly necessary for assembly by assembly robots.

ADVANTAGES OF THE INVENTION

By embodying the disk according to the invention, it is attained that along with the mounting of the disk on the component, this disk can also be fixed on the component by means of a single work operation. In a special feature, a recess on the component is used for this purpose; a securing part of the disk can be deformed permanently into this recess. Then the securing part can protrude from the side of the disk that does not come into contact on a flange surrounding the component, and upon assembly the component can be deformable into the recess. In a further feature, however, it is also possible to have the securing part protrude toward the plane of the flange, in particular with a double bend provided on the end of the securing part. In the assembly process, the securing part is fastened in a plane between the disk, or the assembly tool contacting the securing part, and the flange and deforms securely into the recess by being stretched.

The recess advantageously comprises an annular plunge cut, so that special positioning of the disk relative to the component is not necessary. It is advantageous to provide a rectangular cross section of the annular plunge cut, thus providing a shoulder that is perpendicular to the mounting direction of the disk, against the shoulder the securing part or the double-bent end of the securing part comes into contact, resulting in a substantially mirror-free connection of the disk to the component perpendicular to the plane of the flange. On the other hand, it is advantageous that the disk on one side has only a securing part that is simply preformed to protrude out of the plane of the disk; the special form permits reliable deformation of the securing part into the recess, without causing upsetting of the securing part before the final position of the securing part is reached. Before the final position of the securing part being deformed is reached, a slight deformation of its end toward the first boundary takes place, so that once again perpendicular to the plane of the flange, a substantially play-free positioning of the disk is attained. The inner contour of the disk and thus the outer contour of the component are also circular in the usual way. However, other forms of the contour and component are also possible. It is also possible that with a rectangular contour, for instance, only one side of the rectangle or two sides of the rectangle have a recess on the component.

BRIEF DESCRIPTION OF THE DRAWINGS

One exemplary embodiment is shown in the drawings and will be described in further detail in the ensuing description.

DESCRIPTION OF THE EXEMPLARY EMBODIMENTS

Figure 1:
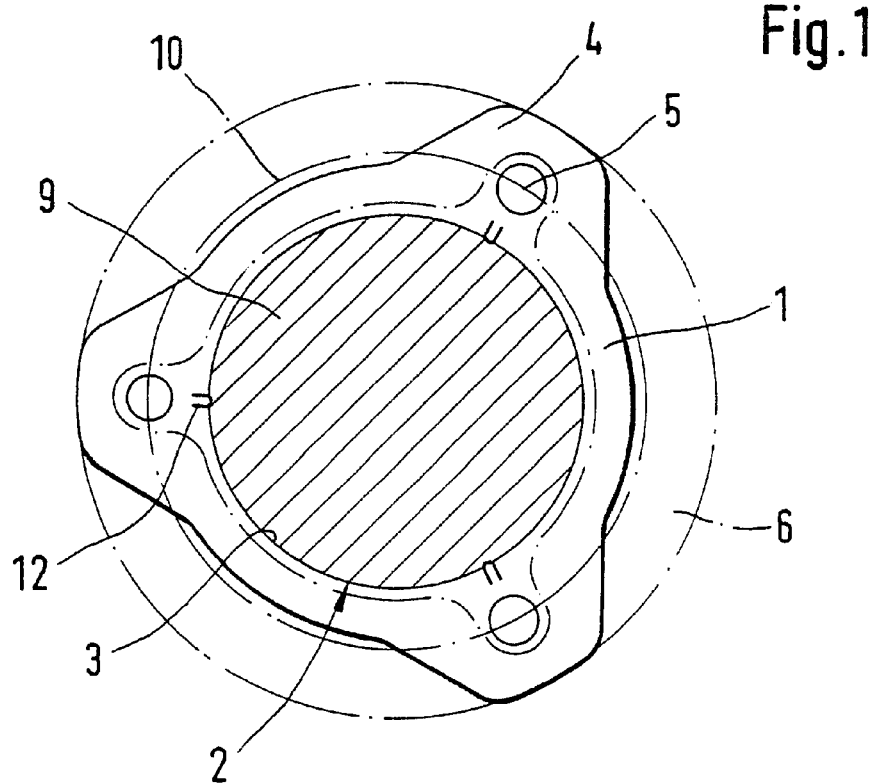
FIG. 1 shows a plan view on a disk, embodied as a seal, in a schematically represented receptacle on a component.
Figure 2:
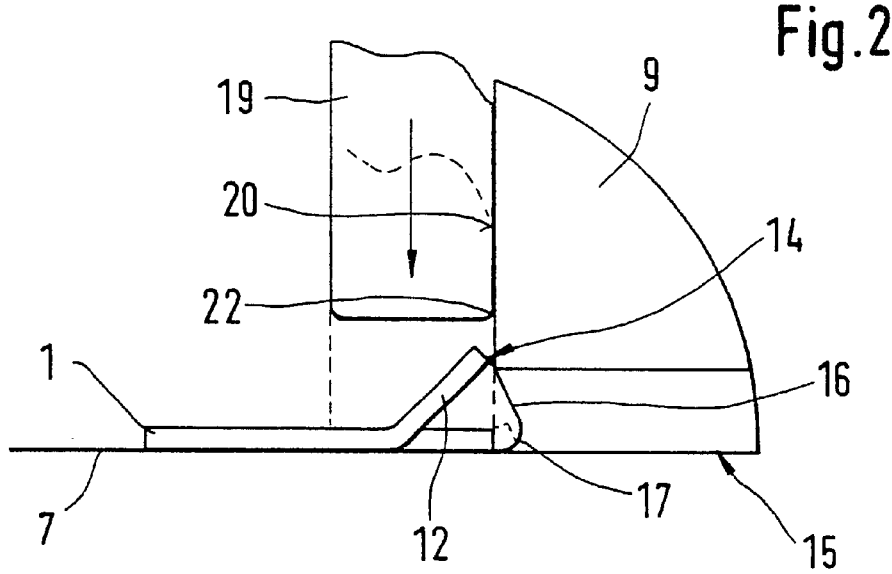
FIG. 2 shows a section perpendicular to FIG. 1 for a first exemplary embodiment showing an outset state of the disk.

In FIG. 1, a disk according to the invention is shown in plan view in its mounting position. The disk 1 has an opening 2, which here has a circular contour 3, and three tabs 4 protrude from its outer circumference, and inside the tabs an opening 5 can be passed so that fastening screws can be passed between two housing parts. Of the housing parts, only one housing part 6 is shown. As FIG. 2 shows, this housing part has a flangelike region 7, which serves as a support of the disk 1 and from which a component 9 in the form of a cylindrical peg protrudes at a right angle. The disk can in particular be embodied as a sealing disk. It then has a sealing bead 10, which is indicated by dashed lines in FIG. 1. Adjacent to the opening 2 or the contour 3, securing parts 12, which are better seen in FIG. 2, also protrude from three points of the circumference of the contour, preferably in the region of the openings for the fastening screws.

FIG. 2 shows the installation position in longitudinal section to the axis of the component 9, which is embodied as a cylindrical peg. It can be seen that the securing part 12 has been predeformed away from the flange 7 with a bend at an angle of from approximately 30° to 45° out of the plane of the disk 1. Beginning at the inner contour 3, the disk has two plunge cuts extending parallel to a radius, thus forming a tab that is then formed out as a securing part 12. FIG. 2 shows that the end 14 of the securing part is aligned with the contour 3, in terms of the axial direction of the component 9. It can also be seen from FIG. 2 that the component 9 has a recess 15, which by way of example is embodied as an annular recess. In section, on the side remote from the flange 7, this recess has a linearly extending first boundary 16, which extends inclined to the axis or to the jacket face of the component 9 and after that changes over to a rounded feature that ends in the form of a second boundary 17 at a tangent in the plane of the flange on the side of the flange toward the recess. The width and depth of the recess are dimensioned such that the securing part 12 can be deformed out of its outset position shown in FIG. 2 into the recess, without first causing upsetting. To that end, an assembly tool 19 in a form of a die is used, which as shown in FIG. 2 is guided on the jacket face 20 of the component 9 and is moved toward the flange 7 along this jacket face. The securing part 12 is deformed out of the position shown into the recess 15, as is shown in the final state in FIG. 3. In this final state, it can be seen that the securing part protrudes past the contour 3. Shortly before the final position is reached, the part 21 of the securing part 12 that protrudes into the recess comes into contact with the second boundary 17 and is deformed at the second boundary around the inner edge 22 of the assembly tool, in such a way that in particular and in an advantageous way, the face end 24 of the end 14 of the securing part 12 comes to be approximately parallel to the first boundary 16 or enters into contact with the first boundary. In this way, the position of the disk on the flange 7 is axially secure. The disk or sealing disk, which for instance is of metal, has in this way been permanently deformed, and this permanent deformation accomplishes the securing with the aid of the securing part.

Figure 3:
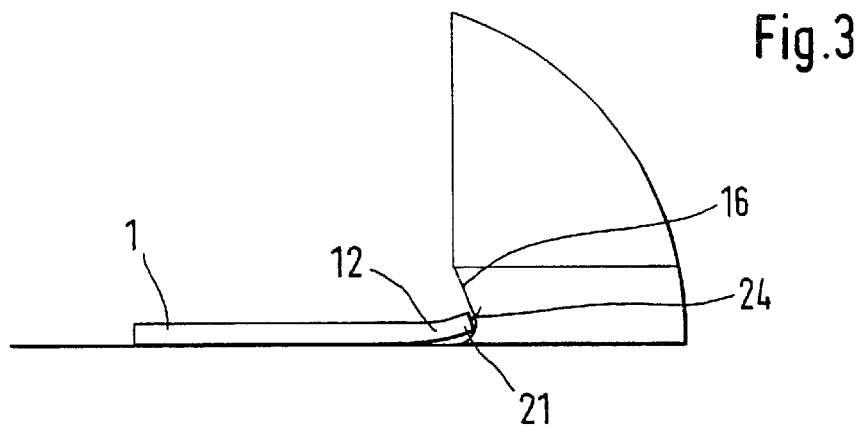
FIG. 3 shows the final state of the disk after deformation of the disk by an assembly tool in the version of FIG. 2.
Figure 4:
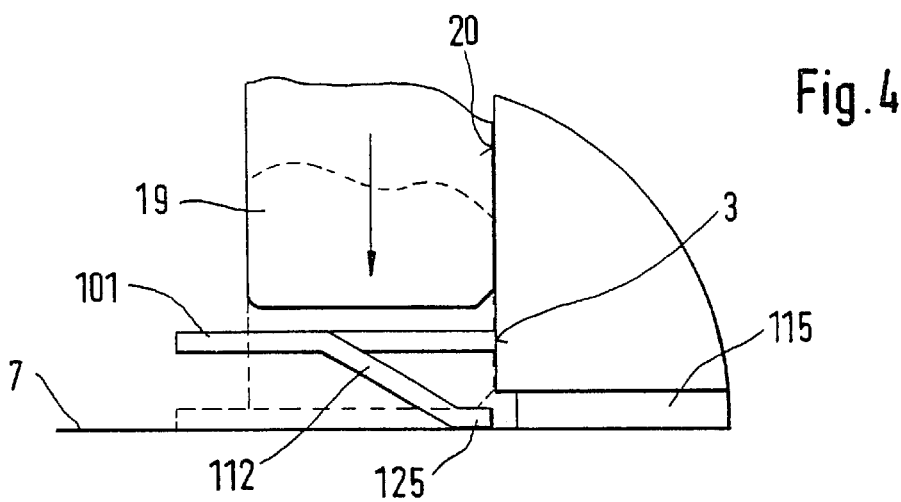
FIG. 4 shows a second exemplary embodiment with an alternatively formed disk in its outset state.
Figure 5:
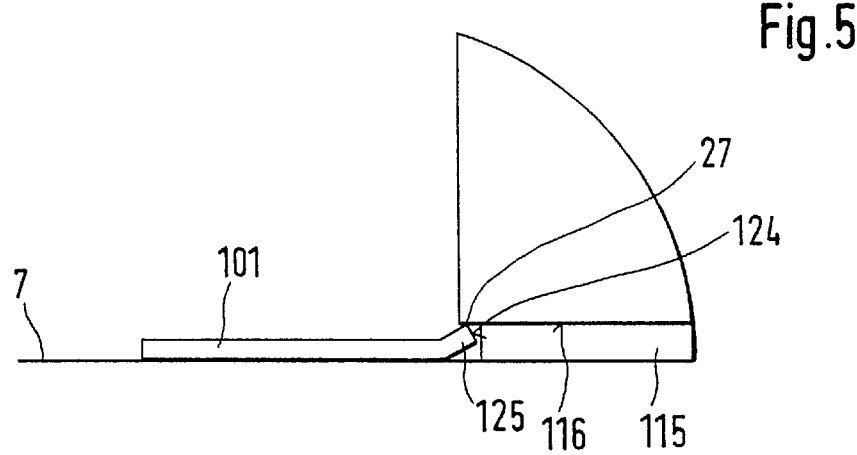
FIG. 5 shows the final state after deformation of the disk of FIG. 4 by an assembly tool.

A second exemplary embodiment of the invention is shown in FIGS. 4 and 5. Here the securing part 112 has been bent in the outset state toward the plane of the flange 7 and furthermore has an additional second bend 125, which puts the end of the securing part 12 back in the plane of the flange, such that a small support is formed toward the side of the contour 3 of the disk. The recess provided in FIGS. 2 and 3 is now embodied as a recess 115 of rectangular cross section, directly adjacent to the plane of the flange 7. FIG. 4 shows the disk 101 in the outset position before final assembly. It can be seen here that in an especially advantageous way, the contour 3 is guided exactly on the jacket face 20 of the component 9, and the disk itself is in contact with the flange 7 only via the second bend 29. As in the previous exemplary embodiment, once again the assembly tool 19 deforms the securing part 112 in such way that the securing part enters the plane of the disk 101. In the process, the double-bent part 25 slides into the recess 115 and then, in the final position shown in FIG. 5, protrudes upward corresponding to the double-bend angle. In this process, the face end 124 of the second bend 125 comes to rest inside the recess 115, and its upper edge 27 comes to rest on the first boundary 116 of the recess 115. Thus the final position of the disk 101 is fixed in the position shown of contact on the flange 7, so that the disk is held in this position with only little play or no play at all.

After this mounting of the disk, a second component can be mounted on the first component, thus making a suitable connection between the two components. In particular, a tight connection can also be made. Instead of the securing parts 12 and 112 shown here and disposed on the inner contour, the securing parts can also be provided on the outer circumference, given a suitable association with a cylindrical jacket face on the outer circumference of the disk. In that case, the recesses would be disposed on the outer jacket face.

In the manner described, a preassembly of disks or sealing disks can be done in a simple and secure manner, the disks being embodied suitably to assure that after being mounted on the component the disk can no longer be lost. Such a disk is thus especially highly suitable for use in an automatic assembly system.

The foregoing relates to a preferred exemplary embodiment of the invention, it being understood that other variants and embodiments thereof are possible within the spirit and scope of the invention, the latter being defined by the appended claims.

We claim:

1. A generally planar preformed sealing disk (1), comprising a contour (3) that is associated with a receptacle in a component (9), a recess is shaped in the component, which recess is complementary to the contour (3), characterized in that the disk (1, 101) comprises a permanently deformable material, said disk can be positioned on a flange (7) adjacent to the component (9), and can be centered on said flange (7) via the component (9), said recess (15, 115) of the component (9) being adjacent to the flange(7), and at least two tab shaped securing parts (12, 112), which in their preformed, original positions extend out of the plane of the disk and toward the component (9) are disposed on the disk (1, 101), and the end (14, 124) of the tab shaped securing parts (12, 112), in their preformed, original position, extend at most as far as a line describing the contour (3), and the at least two securing parts (12, 112) being deformable by direct engagement with an assembly tool (19) perpendicularly to the plane of the flange and upon deformation are deformed past the contour into the inside of the recess (15, 115) for a positive engagement with the component (9).

2. The disk according to claim 1, in which the contour (3) is circular, and the component has a circular-cylindrical jacket face (20).

3. The disk according to claim 1, in which the contour is formed by an inner recess of the disk.

4. The disk according to claim 1, in which the at least one securing part (12, 112) is deformable by the assembly tool (19) out of the preformed position protruding out of the plane of the disk (1, 101) substantially into the plane of the disk (1, 101) and of the flange (7) on which the disk comes to rest.

5. The disk according to claim 4, in which the at least one securing part (12), in the outset state before the deformation by the assembly tool (19), is bent in such a way that the securing part protrudes at an angle of approximately 30° out of the plane of the disk (1) and in an opposite direction from the side of the disk that comes to rest on the flange (7).

6. The disk according to claim 4, in which the contour is formed by an inner recess of the disk.

7. The disk according to claim 4, in which the contour (3) is circular, and the component has a circular-cylindrical jacket face (20).

8. The disk according to claim 4, in which the at least one securing part (112) in the outset state before assembly is bent such that the securing part protrudes at an angle of approximately 30° out of the plane of the disk (101), being inclined toward the flange (7).

9. The disk according to claim 8, in which the contour is formed by an inner recess of the disk.

10. The disk according to claim 8, in which the contour (3) is circular, and the component has a circular-cylindrical jacket face (20).

11. The disk according to claim 8, in which the at least one securing part (112) in the outset state before the deformation by the assembly tool (19) has a second bend (125) that is contrary to the bending on an end, said second bend before the deformation by the assembly tool comes into flat contact with the flange (7) and after the deformation by the assembly tool comes to rest inside the recess (115).

12. The disk according to claim 11, in which the contour is formed by an inner recess of the disk.

13. The disk according to claim 11, in which the recess (115) is an annular plunge cut, provided with a rectangular cross section, in the component.

14. The disk according to claim 11, in which the contour (3) is circular, and the component has a circular-cylindrical jacket face (20).

15. A sealing disk (1), comprising a contour (3) that is associated with a receptacle in a component (9), a recess is shaped in complementary form to this contour (3), characterized in that the disk (1, 101) comprises a permanently deformable material, said disk can be positioned on a flange (7) adjacent to the component (9), and can be centered on said flange (7) via the component (9), and that at least one securing part (12, 112) which extends toward the component (9) is disposed on the disk (1, 101) and upon deformation forms a positive engagement with the component (9) and in which the component (9), adjacent to flange (7), has a recess (15, 115), into which the at least one securing part (12, 112) protrudes out of a plane of the disk (1, 101), is formable by an assembly tool (19), and the end (14) of the securing part (12, 112), in a non-formed-in outset state, extends at most as far as a line describing the contour (3), while in the formed-in state the securing part is deformed past this line into the inside of the recess (15, 115), wherein the at least one securing part (12, 112) is deformable by the assembly tool (19) out of the preformed position protruding out of the plane of the disk (1, 101) substantially into the plane of the disk (1, 101) and of the flange (7) on which the disk comes to rest, wherein the at least one securing part (112) in the outset state before assembly is bent such that the securing part protrudes at an angle of approximately 30° out of the plane of the disk (101), being inclined toward the flange (7), and in which the recess in the component (9) is a plunge cut (15), of annular shape, with an inclined or rounded first boundary (16) remote from the flange on one side and a rounded second boundary (17) toward the flange (7) on another side, such that the course of the end (14) of the at least one securing part out of its outset position before assembly, upon deformation by the assembly tool (19) into the plane of the flange extends at most at a tangent to the inclined or rounded first boundary (16).

16. The disk according to claim 15, in which the end (14) of the at least one securing part (12) comes to rest on the second boundary (17) at the end of the deformation of the securing part (12) toward the plane of the flange, and in the course of the deformation of the securing part (12) by the assembly tool (19) is deformable thereon toward the side of the first boundary (16).

17. A generally planar sealing disk (1), comprising a contour (3) that is associated with a receptacle in a component (9), a recess is shaped into the component in complementary form to this contour (3), characterized in that the disk (1, 101) comprises a permanently deformable material, and has at least two tab shaped securing parts (12, 112) having ends, which securing parts are integral with the disk and have original positions in which they are bent out of the plane of the rest of the disk, being bent in a direction towards the component, wherein said disk can be positioned on a flange (7) adjacent to the component (9), and can be centered on said flange (7) via the component (9), said at least two securing parts (12, 112), upon deformation from their original position to a deformed position back into the plane of the disk (1, 101), form positive engagements with the component (9), and in which the component (9), adjacent to flange (7), has a recess (15, 115), into which the at least two securing parts (12, 112) protrude as they are moved to their deformed positions, the at least two securing parts being formable by direct engagement with an assembly tool (19), and the end (14) of the securing parts (12, 112), in their original positions extends at most as far as a line describing the contour (3), and while being moved to the deformed positions, the securing parts are deformed past this line into the inside of the recess (15, 115).

\* \* \* \* \*